United States Patent
Kishita et al.

(10) Patent No.: US 12,454,278 B2
(45) Date of Patent: Oct. 28, 2025

(54) DRIVING OPERATION SUPPORTING APPARATUS HAVING NOTIFICATION UNIT NOTIFYING DRIVER OF OPERATION COMMAND

(71) Applicant: DENSO CORPORATION, Kariya (JP)

(72) Inventors: Yuki Kishita, Kariya (JP); Hiroyuki Nanjo, Kariya (JP); Noriaki Ikemoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 291 days.

(21) Appl. No.: 18/126,054

(22) Filed: Mar. 24, 2023

(65) Prior Publication Data
US 2023/0303107 A1 Sep. 28, 2023

(30) Foreign Application Priority Data
Mar. 25, 2022 (JP) .................... 2022-049388

(51) Int. Cl.
*B60W 50/14* (2020.01)
*B60W 40/06* (2012.01)
*B60W 40/08* (2012.01)

(52) U.S. Cl.
CPC ............ *B60W 50/14* (2013.01); *B60W 40/06* (2013.01); *B60W 40/08* (2013.01); *B60W 2540/00* (2013.01); *B60W 2552/00* (2020.02)

(58) Field of Classification Search
CPC . B60W 2050/0025; B60W 2050/0088; B60W 2050/146; B60W 2540/00; B60W 2540/22; B60W 2552/00; B60W 30/18072; B60W 40/06; B60W 40/08; B60W 50/14
See application file for complete search history.

(56) References Cited

U.S. PATENT DOCUMENTS

| | | | | |
|---|---|---|---|---|
| 10,850,746 | B2 * | 12/2020 | Marti | B60K 35/29 |
| 11,077,858 | B2 * | 8/2021 | Morimoto | B60W 50/16 |
| 2013/0060444 | A1 * | 3/2013 | Matsunaga | B60K 6/485 |
| | | | | 701/99 |
| 2015/0088349 | A1 * | 3/2015 | Akashi | B60W 30/18072 |
| | | | | 180/65.265 |
| 2015/0298699 | A1 * | 10/2015 | Poechmueller | B60W 10/02 |
| | | | | 701/1 |
| 2018/0118189 | A1 * | 5/2018 | Payne | B60L 7/18 |
| 2019/0061772 | A1 * | 2/2019 | Prinz | B60K 28/06 |
| 2019/0135177 | A1 * | 5/2019 | Farrell | B60Q 9/00 |

(Continued)

FOREIGN PATENT DOCUMENTS

| | | | | |
|---|---|---|---|---|
| CN | 110525419 | A * | 12/2019 | B60W 10/08 |
| CN | 108973996 | B * | 1/2023 | B60W 50/16 |

(Continued)

*Primary Examiner* — Babar Sarwar
(74) *Attorney, Agent, or Firm* — Oliff PLC

(57) ABSTRACT

A driving operation supporting apparatus of a vehicle is provided with a notification unit that notifies a driver of an operation command for prompting the driver to perform operations to cause the vehicle to start an inertia travelling; and a changing unit that changes at least one of a frequency of notifications of the notification unit, a notification timing and a notification method, depending on at least one of a burden of the driver, a reduction amount of an energy consumption when performing the inertia travelling and a surrounding situation of the vehicle.

18 Claims, 9 Drawing Sheets

(56) References Cited

U.S. PATENT DOCUMENTS

| | | | | |
|---|---|---|---|---|
| 2019/0311241 A1* | 10/2019 | Friedman | ................ | H04L 67/02 |
| 2019/0315293 A1* | 10/2019 | Arai | ........................ | G06F 13/00 |
| 2020/0031365 A1* | 1/2020 | Marti | ..................... | B60K 35/28 |
| 2020/0039518 A1* | 2/2020 | Kinoshita | ....... | B60W 30/18136 |
| 2020/0086846 A1* | 3/2020 | Kuroda | ............. | B60W 40/105 |
| 2020/0377120 A1* | 12/2020 | Thörn | ................... | G08G 1/164 |
| 2021/0188289 A1* | 6/2021 | Oba | ........................ | G08G 1/16 |
| 2021/0213932 A1* | 7/2021 | Aggoune | .......... | B60W 50/0097 |
| 2022/0144310 A1* | 5/2022 | Hong | ............. | B60W 30/18072 |

FOREIGN PATENT DOCUMENTS

| | | | | |
|---|---|---|---|---|
| DE | 102016200717 A1 * | 7/2017 | ........ | B60W 50/0097 |
| DE | 102017223886 A1 * | 1/2019 | ............ | B60W 50/14 |
| EP | 2743547 A1 * | 6/2014 | ............ | F16H 61/14 |
| EP | 3712028 A1 * | 9/2020 | ........ | B60W 60/0057 |
| JP | 2013199144 A * | 10/2013 | | |
| JP | 2016-203661 A | 12/2016 | | |
| JP | 2017-020460 A | 1/2017 | | |
| JP | 2017039330 A * | 2/2017 | | |
| JP | 2017-146744 A | 8/2017 | | |
| JP | 6689136 B2 * | 4/2020 | ............ | B60W 10/08 |
| JP | 2021-026748 A | 2/2021 | | |
| WO | WO-2013125538 A1 * | 8/2013 | ...... | B60W 30/18072 |
| WO | WO-2019097944 A1 * | 5/2019 | ............ | B60W 50/14 |

\* cited by examiner

DRIVING OPERATION SUPPORTING APPARATUS HAVING NOTIFICATION UNIT NOTIFYING DRIVER OF OPERATION COMMAND

CROSS-REFERENCE TO RELATED APPLICATION

This application is based on and claims the benefit of priority from earlier Japanese Patent Application No. 2022-049388 filed Mar. 25, 2022, the description of which is incorporated herein by reference.

BACKGROUND

Technical Field

The present disclosure relates to a driving operation supporting apparatus.

Description of the Related Art

A driving operation supporting apparatus is known in which a driver is prompted, with a display device or the like, to perform a predetermined driving operation, whereby an inertia travelling can be started at an appropriate timing. Specifically, the predetermined driving operation refers to setting an operation quantity of an accelerator pedal to be 0.

SUMMARY

A driving operation supporting apparatus of a vehicle is provided with a notification unit that notifies a driver of an operation command for prompting the driver to perform operations to cause the vehicle to start inertia travelling; and a changing unit that changes at least one of a frequency of notifications of the notification unit, a notification timing and a notification method, depending on at least one of a burden of the driver, a reduction amount of an energy consumption when performing the inertia travelling and a surrounding situation of the vehicle.

DETAILED DESCRIPTION OF THE PREFERRED EMBODIMENTS

A driving operation supporting apparatus is known in which a driver is prompted, with a display device or the like, to perform a predetermined driving operation, whereby an inertia travelling can be started at an appropriate timing. Specifically, the predetermined driving operation refers to setting an operation quantity of an accelerator pedal to be 0. For example, a patent literature JP-A-2016-203661 discloses a technique in which a timing for prompting the driver to perform a driving operation to start inertia travelling is determined in accordance with a travelling speed or the like.

It is possible that a driver's burden may be increased more than necessary depending on a notification timing for prompting the driver to perform a driving operation or a notification method. For example, in the case where a vehicle is travelling on a narrow width road, the driver carefully drives the vehicle paying close attention to whether a pedestrian will run out into the road. That is, the driver's burden is relatively large in this case. In such a circumstance, when the driving operation supporting apparatus executes a notification process to prompt the driver to perform a driving operation, the driver's burden increases even more. Moreover, when the driver is notified with a loud sound under the above-described situation, the driver is likely to feel more discomfort compared to a normal situation where the driver has a smaller burden.

In this respect, the apparatus disclosed by the above-mentioned patent literature may be required to improve in order to optimize the notification timing and the notification method considering the driver's burden and the like.

Hereinafter, with reference to the drawings, embodiments of the present disclosure will be described. In the respective drawings, in order to facilitate understanding of the embodiments, the same reference numbers are applied to the same elements and duplicated explanation will be omitted.

A first embodiment will be described. A driving operation supporting apparatus 10 according to the present embodiment is mounted on a vehicle MV and configured as an apparatus for supporting a part of operations performed by the driver of the vehicle MV. Firstly, a configuration of the vehicle MV will be described before explaining the driving operation supporting apparatus 10.

Figure 1:
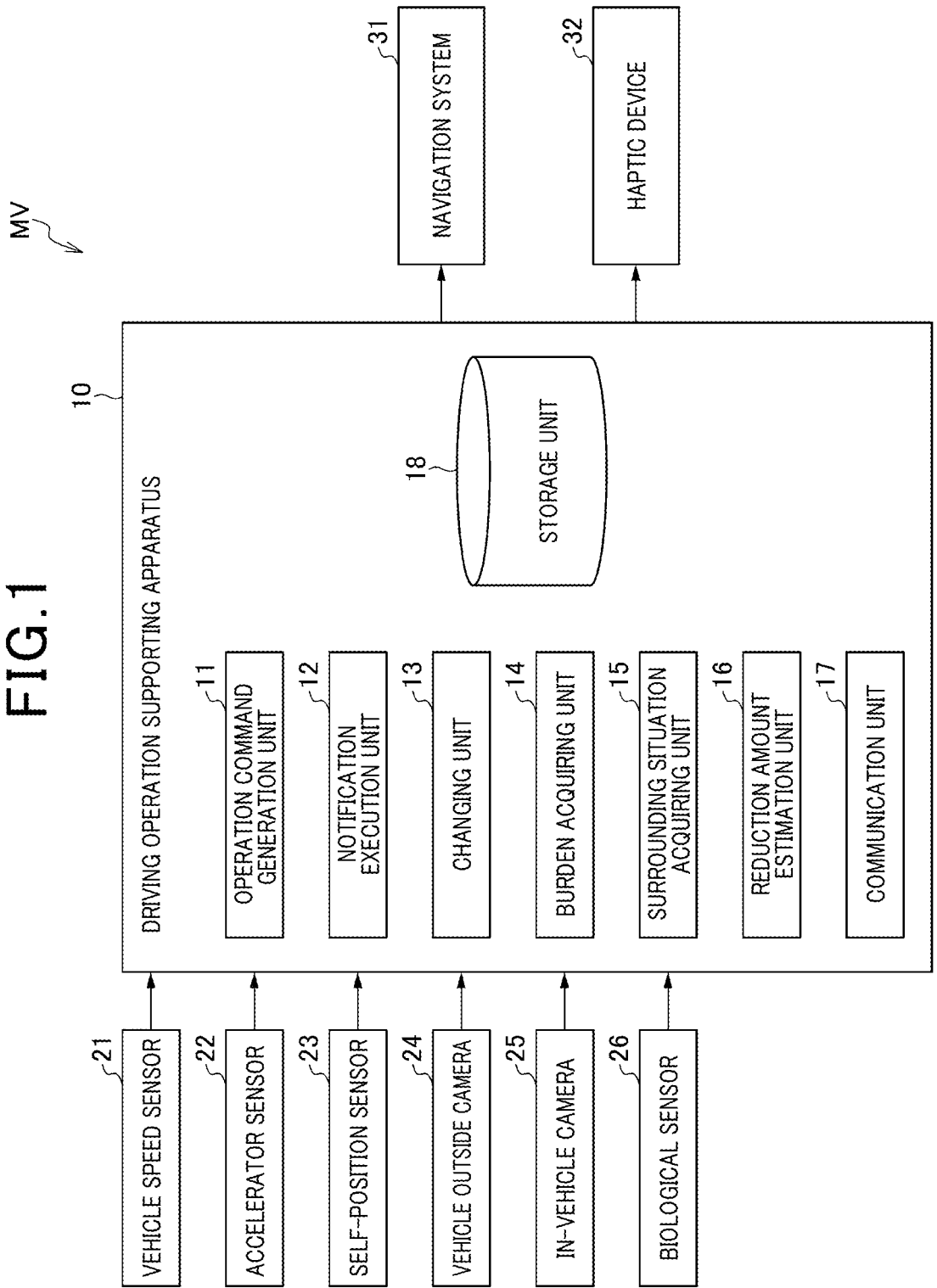
FIG. 1 is a diagram schematically showing a driving operation supporting apparatus according to a first embodiment and a configuration of a vehicle to which the driving operation supporting apparatus is mounted.

FIG. 1 schematically shows an overall configuration of the vehicle MV including the driving operation supporting apparatus 10. The vehicle MV is provided with an internal combustion engine (not shown) and travels with a driving force of the internal combustion engine. Instead of such a configuration, the vehicle MV may be configured as an electric vehicle that travels with a driving force of a rotary electric machine. Further, the vehicle MV may be configured as a hybrid vehicle that travels with both driving forces of the internal combustion engine and the rotary electric machine.

In the vehicle MV, various sensors are provided. In FIG. 1, among these sensors, a vehicle speed sensor 21, an accelerator sensor 22, a self-position sensor 23, a vehicle-outside camera 24 and an in-vehicle camera 25 and a biological sensor 26 are shown.

The vehicle speed sensor 21 serves as a sensor that detects a vehicle speed (i.e. travelling speed) of the vehicle MV. The vehicle speed sensor 21 detects a vehicle speed based on a rotation speed of the wheels (not shown), for example. The vehicle speed detected by the vehicle speed sensor 21 is transmitted to the driving operation supporting apparatus 10.

The accelerator sensor 22 detects an operation quantity of the accelerator pedal (not shown), that is, a depression amount of an accelerator pedal (not shown) provided in the vehicle MV. The operation quantity detected by the accelerator sensor 22 is transmitted to the driving operation supporting apparatus 10.

The self-position sensor 23 detects a current travelling position of the vehicle MV. The self-position sensor 23 utilizes a global navigation satellite system (GNSS) such as GPS, for example, and always acquires the travelling position of the vehicle MV. The travelling position of the vehicle MV detected by the self-position sensor 23 is transmitted to the driving operation supporting apparatus 10.

The vehicle-outside camera 24 captures an image around the vehicle MV (outside the vehicle cabin) and is configured of a CMOS camera. The image captured by the vehicle-outside camera 24 is repeatedly transmitted to the driving operation supporting apparatus 10 at a predetermined period. With the images captured by the vehicle-outside camera 24, the driving operation supporting apparatus 10 is able to determine whether another vehicle travelling ahead of the vehicle MV is present, detect an inter-vehicle distance between the own vehicle and other vehicle and recognize the number of traffic lanes of the travelling road where the vehicle MV travels and a congestion situation and the like. As an apparatus for measuring the inter-vehicle distance and the like, in addition to the vehicle-outside camera 24 or instead of the vehicle-outside camera 24, other apparatus may be provided. For example, a radar apparatus or an LIDAR sensor can be used for such an apparatus.

The in-vehicle camera 25 is configured of, for example, a CMOS camera, capturing a state inside the vehicle cabin of the vehicle MV. The images captured by the in-vehicle camera 25 is repeatedly transmitted to the driving operation supporting apparatus 10 at a predetermined interval. With the images captured by the in-vehicle camera 25, the driving operation supporting apparatus 10 is able to recognize an awareness level of the driver from pupils of the driver, and also recognize the number of passengers in the vehicle MV.

The biological sensor 26 detects biological signals of the driver and is attached to the body of the driver. The biological signals detected by the biological sensor 26 includes signals correlated to the driver's burden such as a heart rate and an operation speed of the driver MV. The biological signals detected by the biological sensor 26 are transmitted to the driving operation supporting apparatus 10.

The vehicle MV includes a navigation system 31 and a haptic device 32 in addition to the above-mentioned various sensors mounted thereon. As will be described later, each of the above system and device serves as a part of the driving operation supporting apparatus 10 (specifically, notification unit).

The navigation system 31 displays a map showing an area around the vehicle MV on a screen (not shown), thereby notifying the driver of the travelling road or the like where the vehicle MV is required to be travelling. As will be described later, the driving operation supporting apparatus 10 displays an icon indicating an operation command on the screen of the navigation system 31, thereby prompting the vehicle MV to perform a specific driving operation. The above-described driving operation includes an operation to cause the vehicle MV to perform a so-called inertia travelling, that is, an operation for setting an operation quantity of an accelerator pedal to be 0. Note that the operation command may include a command for commanding the driver to perform other operations, but the term 'operation command' in the following description refers to a command for prompting the driver to perform necessary operations to start inertia travelling. The screen of the navigation system 31 serves as a part for notifying the driver of the operation command, and corresponds to a notification unit. Note that the notification unit that notifies the driver on the screen may be provided as an apparatus separately from the navigation system 31. For example, other screen provided on a meter panel or the like may be used as a notification unit for notifying the driver of the operation command.

For the haptic device 32, a part of the haptic device 32 is caused to vibrate, thereby stimulating the tactile sense of the driver. The haptic device 32 is mounted to a steering wheel or a seat and vibrates while a part of the haptic device 32 touches a body of the driver. As described, a part of the haptic device 32 may touch the driver's body, but the haptic device 32 may not touch the driver's body. In the latter case, the haptic device 32 emits ultrasonic waves towards the driver's body and stimulates the tactile sense of the driver. The haptic device 32 serves as another means for the driver operation supporting apparatus 10 to notify the driver of the above operation command. Actually, the haptic device 32 corresponds to the notification unit together with the screen of the navigation system 31 according to the present embodiment.

Subsequently, with reference to FIG. 1, a configuration of the driving operation supporting apparatus 10 will be described. The driving operation supporting apparatus 10 is configured as a computer system including a CPU, a ROM and a RAM, and mounted on the vehicle MV as described above. Alternatively, a part of or all of the driving operation supporting apparatus 10 may be configured as a cloud server disposed at a location different from the vehicle MV. Further, the functions of the driving operation supporting apparatus 10 which will be described later can be accomplished by a plurality of apparatuses. Thus, the driving operation supporting apparatus 10 is not limited to any specific configurations.

The driving operation supporting apparatus 10 is provided with, as a block element expressing its function, an operation command generation unit 11, notification execution unit 12, a changing unit 13, a burden acquiring unit 14, a surrounding situation acquiring unit 15, a reduction amount estimation unit 16, a communication unit 17 and a storage unit 18.

The operation command generation unit 11 determines whether the above-described operation command is required, and performs a process for generating specific parameters of the driving command if it is required. For example, when estimated that the vehicle MV travels on a flat straight road for a while, the operation command generation unit 11 sets a section where the vehicle MV is required to be inertia-travelling and sets a start point of this section to be a point where the driver is required to be notified of the operation command. The specific contents of the processes executed by the operation command generation unit 11 in order to set the section where the vehicle MV is required to be travelling with an inertial travelling will be described later.

The notification execution unit 12 causes the navigation system 31 as a notification unit and the haptic device 32 to operate in order to notify the driver of the operation command. The notification execution unit 12 basically operates the notification unit at a time when the vehicle MV has arrived at the start point of the section where it is required to be inertia-travelling, but the notification execution unit 12 may not operate the notification unit even at the time when the vehicle MV has arrived at the start point of the section where it is required to be inertially travelling. The conditions for operating the notification unit will be described later. For the above-described notification, a count-down process may be utilized from a time before the vehicle MV reaches the start point. Thus, the driver is able to operate at more accurate timing.

The changing unit 13 changes at least one of a frequency of the notification of the notification unit, the timing and the method thereof depending on predetermines parameters. The contents of the processes executed by the changing unit 13 will be described later.

The burden acquiring unit 14 executes a process for acquiring a burden of the driver. The term burden refers to an amount of burden felt by the driver (also referred to as a stress) when the driver is driving the vehicle MV. For example, in the case where frequent driving operation is required on a road where a traffic jam has occurred, the driver's burden becomes larger than that in a case where the vehicle MV is traveling on a flat straight road. The burden acquiring unit 14 may acquire the above-described burden as a numeric value converted by any method, but the burden acquiring unit 14 may acquire the above-described burden with any other methods. For example, the burden acquiring unit 14 may operate such that a flag is set indicating a large burden when travelling on a road where a traffic jam has occurred and a flag is set indicating a small burden when travelling on a straight road.

The surrounding situation acquiring unit 15 acquires a surrounding situation around the vehicle MV based on images transmitted from the vehicle-outside camera 24. As described above, the surrounding situation acquired by the surrounding situation acquiring unit 15 includes information of whether another vehicle travelling ahead of the vehicle MV is present, an inter-vehicle distance with the other vehicle, the number of traffic lanes of the travelling road where the vehicle MV travels, a congestion situation and the like. This information is used for the burden acquiring unit 14 in order to acquire a burden of the driver.

The reduction amount estimation unit 16 estimates a reduction amount of an energy consumption consumed when the vehicle MV performs inertia driving. The specific method for estimating the reduction amount of the energy consumption will be described later.

The communication unit 17 functions as an interface when the vehicle MV perform a wireless communication with external devices. The driving operation supporting apparatus 10 communicates with external devices via the communication unit 17, whereby the vehicle MV is able to acquire information whether a traffic jam is present on a travelling road where the vehicle MV will be travelling, weather information and the like.

The storage unit 18 is a nonvolatile memory device included in the driving operation supporting apparatus 10, for example HDD or SSD. The storage unit 18 stores necessary information for the driving operation supporting apparatus 10 to perform the processes. The detailed example of the information stored in the storage unit 18 will be described later.

Figure 2:
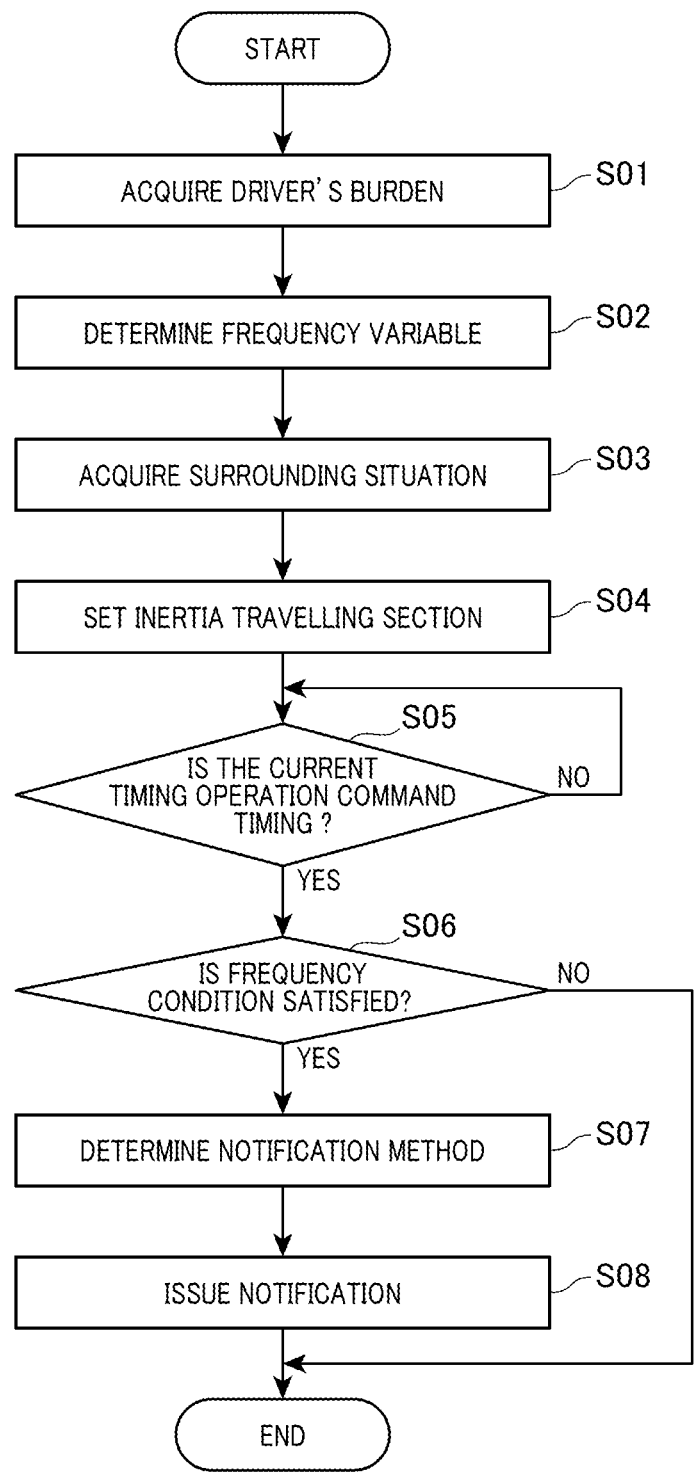
FIG. 2 is a flowchart showing processes executed by the driving operation supporting apparatus according to the first embodiment.

The detailed processes executed by the driving operation supporting apparatus 10 will be described with reference to FIG. 2. The series of processes shown in FIG. 2 are repeatedly executed at every time when a predetermined control period elapses while the vehicle MV is travelling.

In the first step S01, a process for acquiring driver's burden is executed by the burden acquiring unit 14. The burden acquiring unit 14 according to the present embodiment acquires the driver's burden by quantizing the driver's burden to be numeric values in accordance with a biological signal detected by the biological sensor 26.

For example, the burden acquiring unit 14 acquires the drivers awakening level based on the biological signal to acquire the burden such that the lower the awareness level, the larger the driver's burden is. As a specific method for acquiring the awareness level based on the biological signal, since a publicly known method such as a method disclosed by JP-A-2017-146744 can be utilized, explanation thereof will be omitted.

Instead of the above-described configuration, the burden acquiring unit 14 may acquire a degree of fatigue of the driver based on the biological signal, thereby acquiring the burden such that the larger the degree of fatigue, the larger the burden value is. The degree of fatigue may be acquired based on the biological signal or may be acquired based on the image of the driver captured by the in-vehicle camera 25. As a specific method for acquiring the degree of fatigue, since a publicly-known method, such as a method disclosed in a patent literature, JP-A-2021-2674 can be utilized, the detailed explanation thereof will be omitted.

The biological signal used in the present embodiment may be a signal indicating at least one of the degree of fatigue and the awareness level of the driver. Alternatively, the biological signal may be a signal indicating both of the degree of fatigue and the awareness level. The burden acquiring unit 14 may acquire both of the degree of fatigue and the awareness level based on the biological signal and the like, and acquire the driver's burden taking both values into consideration.

The burden acquiring unit 14 may quantize and acquire the driver's burden. For example, the burden acquiring unit 14 may acquire the burden such that the larger the degree of congestion of a road where the vehicle MV travels, the larger the burden value is. The congestion degree can be determined depending on the number of other vehicles on an image captured by the vehicle-outside camera 24, road traffic information acquired by the communication unit 17, an elapsed time from a time when the vehicle MV starts to travel to when the vehicle MV reaches the current location and the like.

The burden acquiring unit 14 may acquire the burden such that the lower the number of traffic lanes where the vehicle MV travels, the larger the burden value is. This is because, on a travelling road of which the number of traffic lanes is low, since the road width is small and a pedestrian is likely to run out into the travelling road, the driver's burden becomes large. The number of traffic lanes can be acquired based on an image captured by the vehicle-outside camera 24, map information included in the navigation system 21, information acquired by the communication unit 17.

The burden acquiring unit 14 may acquire the burden such that the larger the number of traffic signals provided on the travelling road where the vehicle MV travels, that is, the number of traffic signals provided in a predetermined area from the current location to a location a predetermined distance away from the current location, the larger the burden value is. The number of traffic signals can be acquired based on the map information included in the navigation system 31, information acquired by the communication unit 17 and the like.

Thus, the burden acquiring unit 14 may acquire the driver's burden based on the state of the travelling road such as the congestion degree of the travelling road where the vehicle MV travels, the number of traffic lanes of the travelling road and the number of traffic signals provided in the predetermined area. Also, the burden acquiring unit 14 may acquire the driver's burden taking a plurality of elements among the congestion degree of the travelling road where the vehicle MV travels, the number of traffic lanes of the travelling road and the number of traffic signals provided in the predetermined area.

For example, in the case where the vehicle MV is a passenger vehicle such as bus, the burden acquiring unit 14 may acquire the burden such that the larger the number of passengers on the vehicle MV, the larger the burden value is. This is because, the driver's burden is likely to increase in order to ensure the safety of the passengers when the number of passengers (i.e. the number of customers) becomes large.

In the case where the vehicle MV is a passenger vehicle such as bus, the burden value may be acquired such that the smaller the margin value of the operational hour, the larger the burden value is. The margin value of the operational hour refers to a difference between an on-schedule arrival time and an estimated arrival time which is set to be smaller value when both arrival times are close to each other. Further, in the case where the estimated arrival time is delayed with respect to the on-time arrival time, the above-mentioned difference, that is, the margin of the operational hour is calculated as a negative value. In the case where the margin value of the operational hour is negative so that the estimated arrival time is unlikely to be satisfied, the burden acquiring unit 14 may not acquire the driver's burden, and may not adjust a notification frequency which will be described later. In the case where the estimated arrival time is unlikely to be satisfied, the operation command may not be notified.

The burden acquiring unit 14 may acquire the burden value such that the darker the ambient brightness around the vehicle MV, the larger the burden value is. The ambient brightness around the vehicle MV can be acquired from the image captured by the vehicle-outside camera 24 or a luminance sensor separately provided.

Thus, the burden acquiring unit 14 acquires the driver's burden based on at least one of parameters in the biological signal of the driver, the state of the travelling road where the vehicle MV travels, the number of passengers in the vehicle MV, a margin of an operation schedule of the vehicle MV and an ambient brightness around the vehicle MV. Alternatively, the burden acquiring unit 14 may acquire the driver's burden based on a plurality of parameters in the above-mentioned parameters.

For example, the burden acquiring unit 14 may acquire the driver's burden separately based on each parameter in the above-described parameters and may acquire the largest burden value among the acquired plurality of parameters to be the conclusive burden value. Also, the average value of the plurality of acquired burden values or a weight average value where a predetermined weight is applied can be acquired as the conclusive burden value. In the latter case, a weight may be appropriately applied to each burden value, in an appropriate manner depending on a rule of thumb.

At step S1 shown in FIG. 2, after the processes for acquiring the driver's burden are executed as described above, the process proceeds to step S02. At step 502, a process for determining a value of a frequency variable is executed based on an amount of the burden acquired at step S01. The frequency variable indicates a frequency of notifications issued by the notification unit in which the value thereof ranges from 0 to 1. Note that a notification of the operation command is not issued at all when the frequency variable is 0. Specifically, even in the case where the operation command generation unit 11 sets the section for the inertia travelling and the vehicle MV reaches the start point of the section for the inertia travelling, the notification of the operation command is not issued at all. On the other hand, when the frequency variable is 1, the frequency of the notification of the operation command is the highest. In other words, when the operation command generation unit 11 sets the inertia travelling section, the notification of the operation command is definitely issued at the start point of the section of the inertia travelling.

Figure 3:
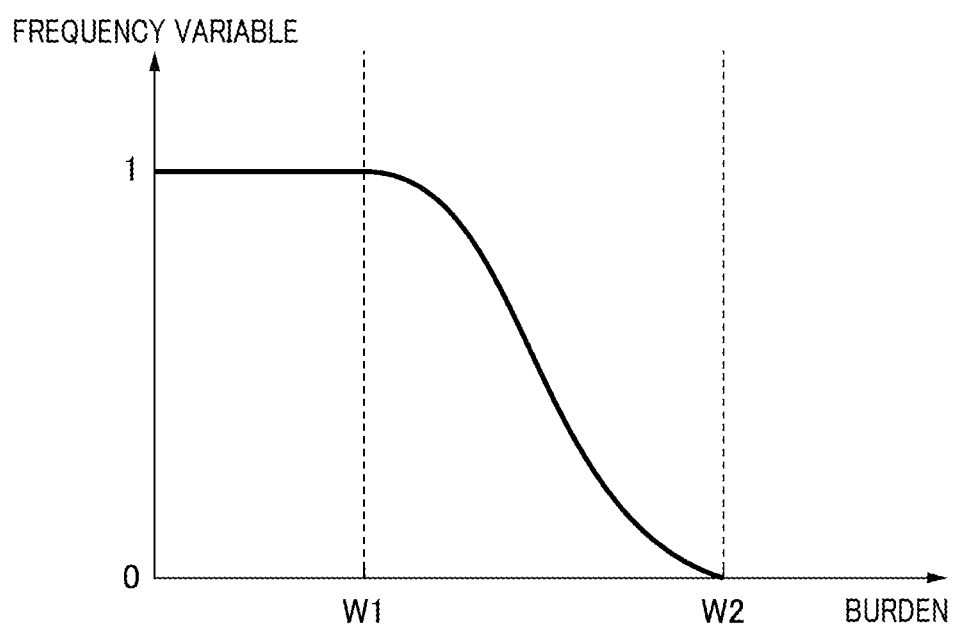
FIG. 3 is a graph showing a relationship between a driver's burden and a frequency variable.

The frequency variable is set referring to the map shown in FIG. 3 for example. The map shown in FIG. 3 illustrates a correspondence between the driver's burden (horizontal axis) and a frequency variable (vertical axis), and is stored in the storage unit 18. In an example illustrated in FIG. 3, the frequency variable is always set to be 1 when the burden value is smaller than W1. In the case where the burden value ranges from W1 to W2, the frequency variable is set such that the larger the burden value, the smaller the frequency variable is. In the case where the burden value is larger than W2, the frequency variable is always set to be 0.

Thus, according to the present embodiment, when the driver's burden becomes larger, the frequency variable is set to be smaller. As a result, the frequency of notifying the driver of the operation command becomes smaller. The frequency variable is set by the changing unit 13. In other words, the changing unit 13 changes the frequency of the notification issued by the notification unit depending on the driver's burden. Note that detailed explanation of frequency set as described above will be described later.

At step S03 subsequent to step S02, a process for acquiring the surrounding situation around the vehicle MV is executed by the surrounding situation acquiring unit 15. At this step, necessary information for setting the section where the vehicle MV is required to be inertia-travelling (hereinafter also referred to as inertia traveling section) is acquired. The information acquired at this step includes, for example, a shape of a travelling road where the vehicle MV will be travelling, the congestion situation thereof, an intervehicle distance between the vehicle MV and another vehicle travelling ahead of the vehicle MV and the like.

At step S04 subsequent to step S03, the operation command generation unit 11 executes, based on the information acquired at step S03, a process for setting the inertia travelling section. The operation command generation unit 11 first sets an end position $P_G$ of the inertia travelling section and a target travelling speed $V_G$ at the end position $P_G$. The end position $P_G$ and the target travelling speed $V_G$ are appropriately set depending on various situations around the vehicle MB such as right-left turn positions in front of the vehicle MV, position of the traffic signals, a position before a traffic-jam section, a position of a bus stop where the vehicle MV will be stopped and a behavior of other vehicles travelling ahead of the vehicle MV, and characteristics of the vehicle MV.

Figure 4:
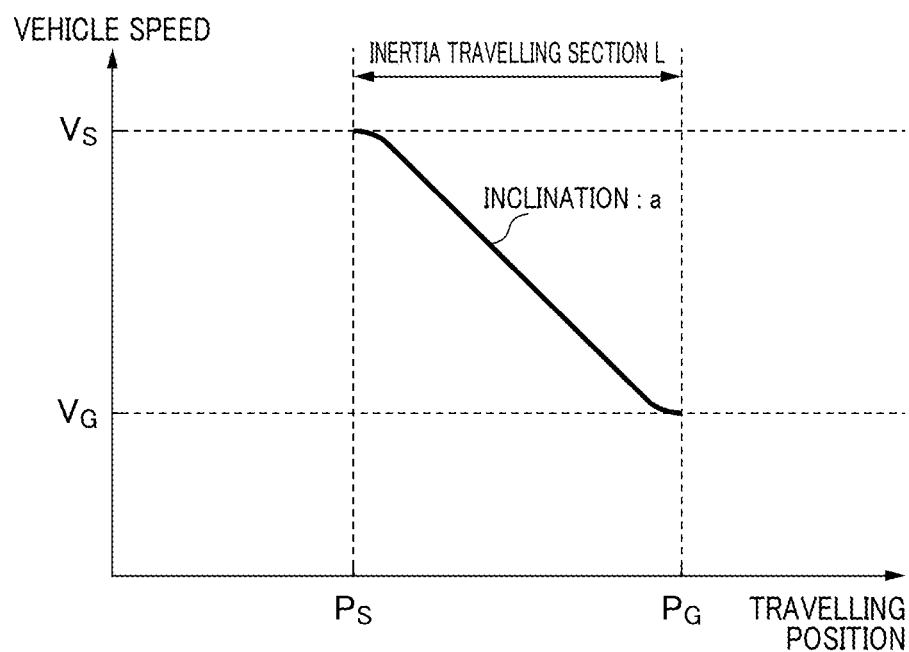
FIG. 4 is a graph showing a method for setting an inertia travelling section.

Here, a deceleration factor when the vehicle MV is inertia-travelling on a flat road is referred to as a. Also, the current travelling speed of the vehicle MV is referred to as $V_S$. When the value of a is acquired in advance, the length of inertia travelling section L can be calculated using the above-mentioned $P_G$, $V_G$, $V_S$, and a. Further, a position before a distance of the inertia travelling section L from the end position $P_G$ can be set to be the start position $P_S$. The section from the start position $P_S$ to the end position $P_G$ thus determined is set to be the inertia travelling section. FIG. 4 illustrates a relationship between $P_G$, $V_G$, $V_S$, $P_S$, L and a.

Assuming that an inclination angle of the travelling road of the vehicle MV is θ, the length of the inertia travelling section L can be calculated using the following equation (1) where g is gravity acceleration.

$$L=(V_S^2-V_G^2)/\{2\times(a+g\sin\theta)\} \qquad (1)$$

The length and location of the inertia travelling section L may be appropriately changed, based on the degree of congestion of a road where the vehicle MV travels, by the changing unit 14. For example, when the degree of congestion ahead of the vehicle MV becomes larger, the changing unit 13 may change the length and the location of the inertial travelling section L such that a location before the congested section is set to be the above-described end position $P_G$. Since the notification timing of the notification unit is changed, the section where the vehicle MV actually travels as an inertia travelling is also changed.

After setting the inertia travelling section at step S04, the process proceeds to step S05. At step S05, the process determines whether the operation command should be issued at the current timing. In the case where the current travelling position of the vehicle MV is at the start position $P_S$ of the inertia travelling section or in the vicinity of the start position $P_S$ of the inertia travelling section, the process determines that the operation command should be issued at this timing. When determined that it is not the timing to issue the operation command yet, the process again executes the process at step S05. On the other hand, when determined that it is the timing to issue the operation command, the process proceeds to step 506.

At step S06, when notified the operation command at the current timing, the process determines whether a frequency condition determined at step S02 is satisfied.

The meaning of frequency according to the present embodiment will be described. At step S05, even if the process determines that it is the timing to issue the operation command, the notification may not be performed, according to the present embodiment. The frequency of the notification to be changed by the changing unit 13 of the present embodiment is a ratio of the number of notifications actually performed by the notification unit to the number of determinations in which the operation command is determined as necessary (i.e. the number of affirmative determinations (Yes) at step S05) during a period where the vehicle MV travels for a predetermined distance D1.

The above-described predetermined distance D1 is a predetermined distance which is set to be sufficiently longer than that of the inertia traveling section L. Hence, the processes shown in FIG. 2 are repeatedly executed during a period where the vehicle MV is travelling in the predetermined distance D1, whereby the inertial travelling section is set plural times at step S04.

Figure 5:
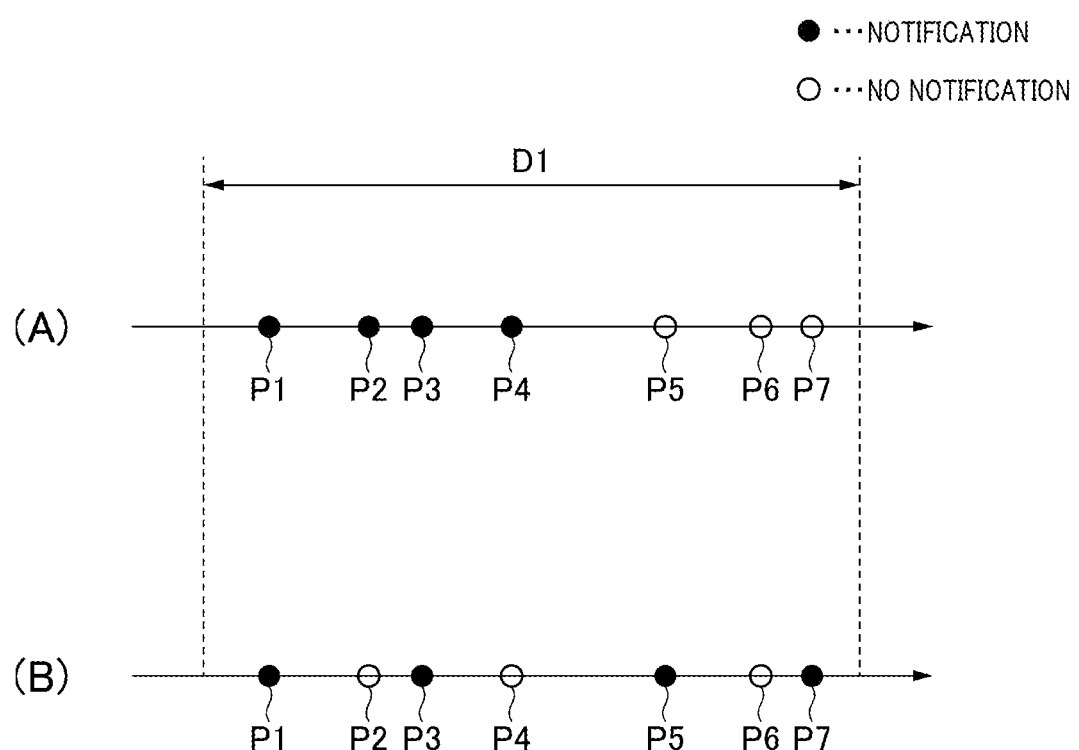
FIG. 5 is a diagram showing a frequency of notifications.

In FIG. 5, P1 to P7 of (A) each indicates a point determined as Yes at step S05 after setting the inertia travelling section at step S04 while the vehicle MV is travelling for a predetermined distance D1. According to an example of (A) shown in FIG. 5, notifications are issued at 4 points from P1 to P4 and no notification are issued at 3 points from P5 to P7. With this example, the frequency of notification is 4/7. For example, in the case where the frequency variable is 4/7 (=0.57) set at step S02, actual notification is issued at the timing indicated in the exampled (A) in FIG. 5.

In the case where the frequency variable set at step S02 is 4/7, actual notification may be issued at the timing indicated by (B) in FIG. 5. According to an example of (B) shown in FIG. 5, notifications are issue at the respective points of P1, P3, P5 and P7. As shown in this example, respective timings of notifications may be adjusted such that the notification timings are equally distributed in a period where the vehicle MV is travelling for a predetermined distance D1.

The definition of the frequency may be different from that described above. For example, the frequency may be set to be the number of notifications issued by the notification unit during a period where the vehicle MV is travelling for a predetermined distance. In this case, the frequency in an example shown in FIG. 5 is 4. At step S02, the frequency coefficient may be calculated as such a value. Further, at step S02, the frequency coefficient may be calculated as a value in a range from 0 to 1 similar to the first embodiment, the calculated value may be turned into an integer value after being multiplied by a predetermined coefficient, thereby calculating the above-described number of notifications (i.e. such as a value of 4).

Referring back to FIG. 2, in the case where a value of the notification frequency when the notifications are issued, exceeds a value of the notification frequency set at step S02, the process determines that a condition of the frequency is not satisfied at step S06. In this case, the process terminates the series of processes shown in FIG. 2 without notifying the driver of the operation command. Otherwise, the process proceeds to step S07.

At step S07, a process for determining a specific method of notification is executed by the changing unit 13.

As disclosed in the present embodiment, in the case where a plurality of types of means (i.e. navigation system 31 and the haptic device 32) as notification units are provided, the changing unit 13 may change the means used for the notification depending on the driver's burden. For example, when the driver's burden acquired at step S01 is relatively small, a notification may be issued using a screen of the navigation system 31, and when the driver's burden is relatively large, a notification may be issued using the haptic device 32.

The means as the notification unit provided on the vehicle MV may be different from examples in the present embodiment. For example, a speaker that emits a sound or a lamp that emits light may be provided. The notification unit provided in the vehicle MV may utilize, as a means, one of a sound, a screen display, a light and a vibration. Preferably, two types of means among a sound, a screen display, a light and a vibration may be utilized, and the means used for the notification may be changed depending on the driver's burden.

The notification means may be changed by the changing unit 13 based on the surrounding situation around the vehicle MV not the driver's burden. For example, in the case where a corner portion is present ahead of the inertia travelling section, the screen of the navigation system 31 may be utilized for the notification, and in the case where a traffic jam is present ahead of the inertia travelling section, the haptic device 32 may be utilized for the notification. Thus, the driver is able to recognize whether the reason for performing an inertia travelling is a static reason such as presence of a corner portion or a dynamic reason such as presence of a traffic jam.

At step S07, a notification method by a single notification means may be changed. For example, when a notification by a sound is issued, a loudness of the sound may be changed depending on the awareness level of the driver. Specifically, the notification may be issued such that the lower the awareness level, the larger the loudness of the sound is. Moreover, the type and loudness of the sound may be changed depending on the reason for performing the inertia travelling. The changing unit 13 may change at least one of the loudness, tone and phrase of the sound to be emitted.

For example, in the case where the notification is issued on the screen display, a method of displaying the notification may be differentiated depending on the driver's burden. Specifically, the display method may be changed such that the larger the drive's burden, the larger the icon to be displayed is or a more easily-recognized position is set. Moreover, the visibility may be enhanced by changing the color or the background image of the screen display depending on the brightness in the outside of the vehicle. Further, the screen display may be changed depending on a reason for performing an inertia travelling. The changing unit 13 may change at least one of a brightness, a color of the screen display, a color of background image, a size of the screen display, a type of icon and a display position of the icon.

For example, when the notification is issued by an emission of lamp, the emission method may be changed depending on the driver's burden. For example, the color of emission, an emission type or an emission pattern may be changed depending on the brightness in the outside of the vehicle, and an amount of the driver's burden. Also, the emission method may be changed depending on a reason why the inertia travelling is performed. The changing unit 13 may change at least one of the brightness of the light to be emitted, the color of the light and the emission timing thereof.

For example, when the notification is issued by the haptic device 32, a vibration method may be changed depending on the awareness level of the driver. For example, the intensity of the vibration may be set to be larger when the awareness level is low so as to allow the driver to readily recognize the vibration. For example, the intensity and the vibration pattern may be changed depending on the brightness in the outside of the vehicle, an amount of the driver's burden. The vibration method may be changed depending on a reason why the inertia travelling is performed. Further, a vibrating portion where the driver touches or the vibration frequency may be changed. The changing unit 13 may change at least one of the intensity of vibration of the haptic device 32, the vibration position, the vibration pattern and the vibration frequency.

At step S07, the process proceeds to step S08 after determining means and method used for the notification. At step S08, the means and method determined at step S07 are used to issue a notification to the driver. The driver sets an operation quantity of an accelerator pedal to be 0 at this timing. Thus, the vehicle MV starts to perform an inertia travelling.

Thus, the changing unit 13 according to the present embodiment sets the frequency of the notifications issued by the notification unit not to be constant, but changes the frequency of the notifications based on the driver's burden. Thus, when an operation command is issued in a state where the driver's burden is relatively large, the driver's burden can be prevented from further increasing. According to the driving operation supporting apparatus 10 of the present embodiment, the frequency of the notifications is changed taking the driver's burden into consideration, whereby notifications may be more appropriately issued compared to a conventional configuration.

The frequency of the notifications issued by the notification unit may be changed regardless the driver's burden based on the reason why the inertia travelling is performed.

A second embodiment will be described. Hereinafter, configurations different from those in the first embodiment will mainly be described and description of common configurations between first and second embodiment will be appropriately omitted.

Figure 6:
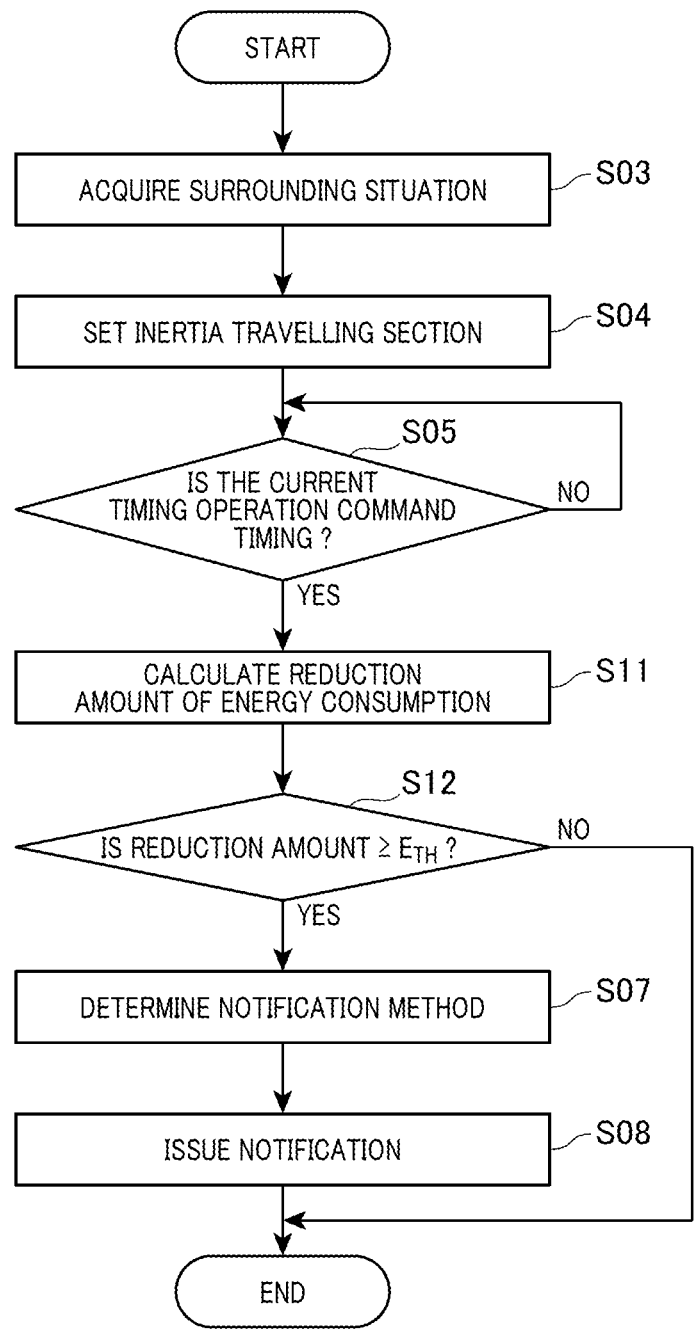
FIG. 6 is a flowchart showing processes executed by the driving operation supporting apparatus according to a second embodiment.

The series of processes shown in FIG. 6 is executed by the driving operation supporting apparatus 10 according to the present embodiment, instead of the series of processes shown in FIG. 2. The processes from steps S03 to S05 shown in FIG. 6 are the same as the steps S03 to S05 shown in FIG. 2.

When the process determines, at step S05, it is a timing for executing an operation command, the process proceeds to step S11 according to the present embodiment. At step S11, the process executes a process for calculating a reduction amount of an energy consumption consumed when performing the inertia travelling.

Figure 7:
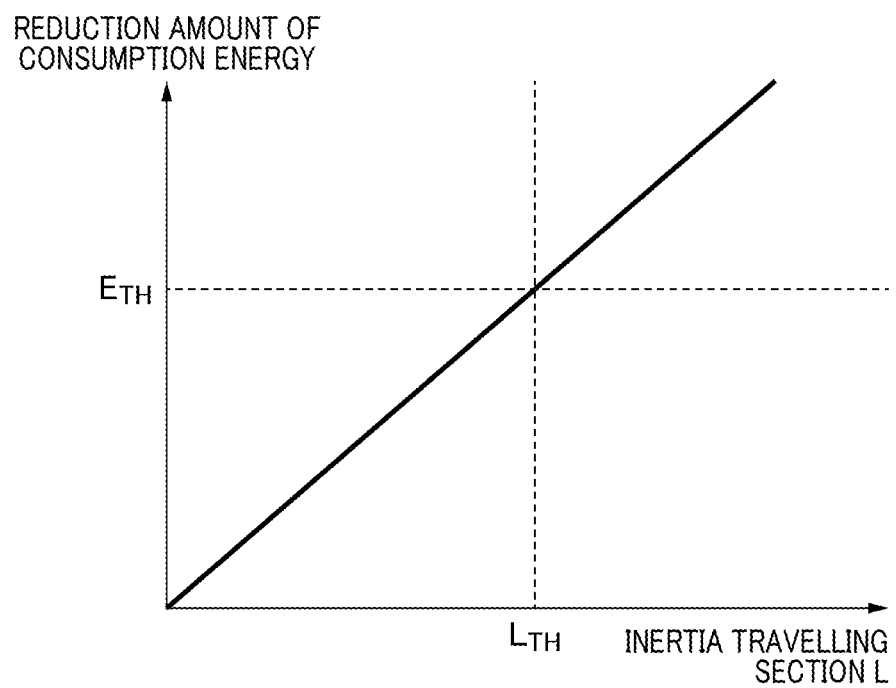
FIG. 7 is a diagram a graph for explaining a method of estimating a reduction amount of an energy consumption.

The longer the inertia traveling section L, the larger a reduction amount of an energy consumption is. FIG. 7 illustrates an example of a relationship between the length of the inertia travelling section L (horizontal axis) and the reduction amount of an energy consumption (vertical axis). Such a relationship is prepared in advance based on the vehicle characteristics of the vehicle MV and stored in the storage unit 18. At step S11, this relationship is used to calculate an estimation value of the reduction amount of an energy consumption corresponding to the inertia travelling section set at step S04. This process is executed by the reduction amount estimation unit 16.

At step S12 subsequent to step S11, the process determines whether the reduction amount of an energy consumption calculated at step S1 is larger than or equal to a predetermined threshold $E_{TH}$. In the case where the reduction amount of an energy consumption is larger than or equal to the threshold $E_{TH}$, the process proceeds to step S07. In this case, similar to the first embodiment, the process notifies the driver of an operation command. At step S12, in the case where the reduction amount of an energy consumption is less than the threshold $E_{TH}$, the process terminates the series of processes shown in FIG. 6 without notifying the operation command.

According to the present embodiment, the process notifies the driver of the operation command only when the reduction amount of an energy consumption during the inertia travelling is larger than or equal to the threshold $E_{TH}$. In other words, the smaller the reduction amount of an energy consumption in the inertial travelling, the smaller the frequency of notifications to the driver of the operation command is. Thus, the changing unit 13 according to the present embodiment changes the frequency of notification by the notification unit in accordance with the reduction amount of an energy consumption during the inertia travelling.

As shown in FIG. 7, the threshold $L_{TH}$ for the inertia travelling section L corresponding to the threshold $E_{TH}$ for the reduction amount of an energy consumption can be set. At step S12, the process may determine whether the inertia travelling section L is larger than or equal to the threshold $L_{TH}$.

At step S07, the means and method used for the notification may be changed depending on the reduction amount of an energy consumption. For example, in the case where notification is issued with a sound, a type or an amount of sound may be changed. At this time, the changing unit 13 may change at least one of an amount of the sound, a tone of the sound and a phrase of the sound.

For example, when the notification is issued with a screen display, a display method may be changed depending on the reduction amount of an energy consumption. At this time, the changing unit 13 may change at least one of a brightness, a color of the screen display, a color of background image, a size of the screen display, and a display position.

For example, in the case where a lamp emission is used as a notification, the emission method may be changed depending on the reduction amount of an energy consumption. When the reduction amount of an energy consumption is larger than a predetermined value, the lamp may emit red light and otherwise the lamp may emit blue light. At this moment, the changing unit 13 may change at least one of the brightness of the light, the color of light and the emission timing of the light.

For example, when the haptic device 32 issues a notification, the vibration method may be changed depending on the reduction amount of an energy consumption. At this moment, the changing unit 13 may change at least one of the intensity of the vibration, the position of the vibration, the vibration pattern and the vibration frequency.

The respective elements of the first embodiment and the second embodiment may be appropriately combined, whereby the changing unit 13 may change at least one of the frequency of the notifications issued by the notification unit, the notification timing and the notification method based on at least one of the driver's burden and the reduction amount of an energy consumption during the inertia travelling and a surrounding situation around the vehicle MV (e.g. reason why the inertia travelling is performed).

The third embodiment will be described. Hereinafter, configurations different from those in the first and second embodiments will mainly be described and description of common configurations between the third embodiment and the first and second embodiment will be appropriately omitted.

Figure 8:
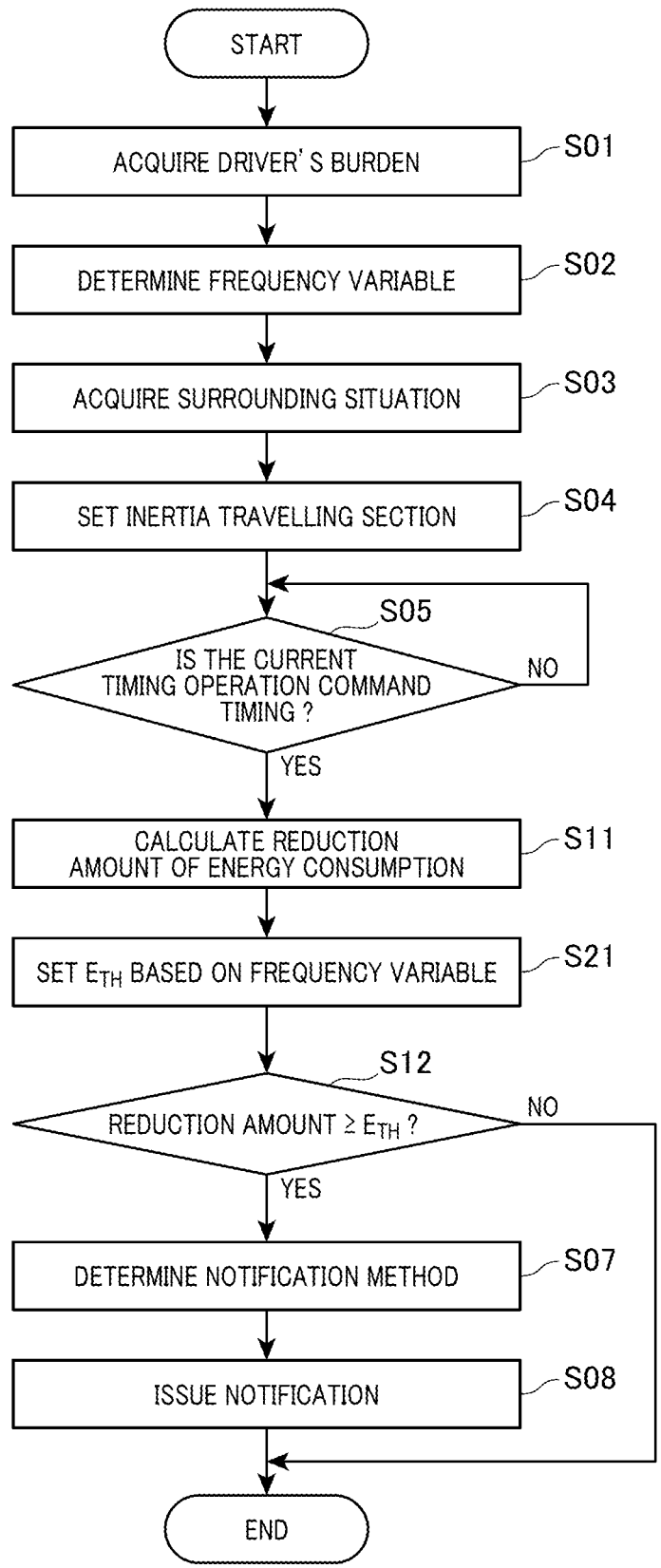
FIG. 8 is a flowchart showing processes executed by the driving operation supporting apparatus according to a third embodiment.

The series of processes shown in FIG. 8 are executed by the driving operation supporting apparatus 10 according to the present embodiment instead of the series of processes shown in FIG. 2. The processes from step S01 to step S05 shown in FIG. 8 are the same as processes at step S01 to step S05 shown in FIG. 2. Also, the process executed at step S11 shown in FIG. 8 is the same as the process executed at step S11 shown in FIG. 6.

According to the present embodiment, the process proceeds to step S21 after calculating a reduction amount of an energy consumption at step S11. At step S21, a process for setting the threshold $E_{TH}$ is executed based on a value of the frequency variable determined at step S02. The threshold $E_{TH}$ is set such that the larger the value of the frequency variable, the smaller the threshold $E_{TH}$ is. In other words, the smaller the driver's burden acquired at step S01, the smaller the threshold $E_{TH}$ is. At step S21, the process may directly set the threshold $E_{TH}$ without using the frequency variable.

The process proceeds to step S12 after executing the process at step S21. The processes executed after step S12 are the same as those in the second embodiment (FIG. 6).

Figure 9:
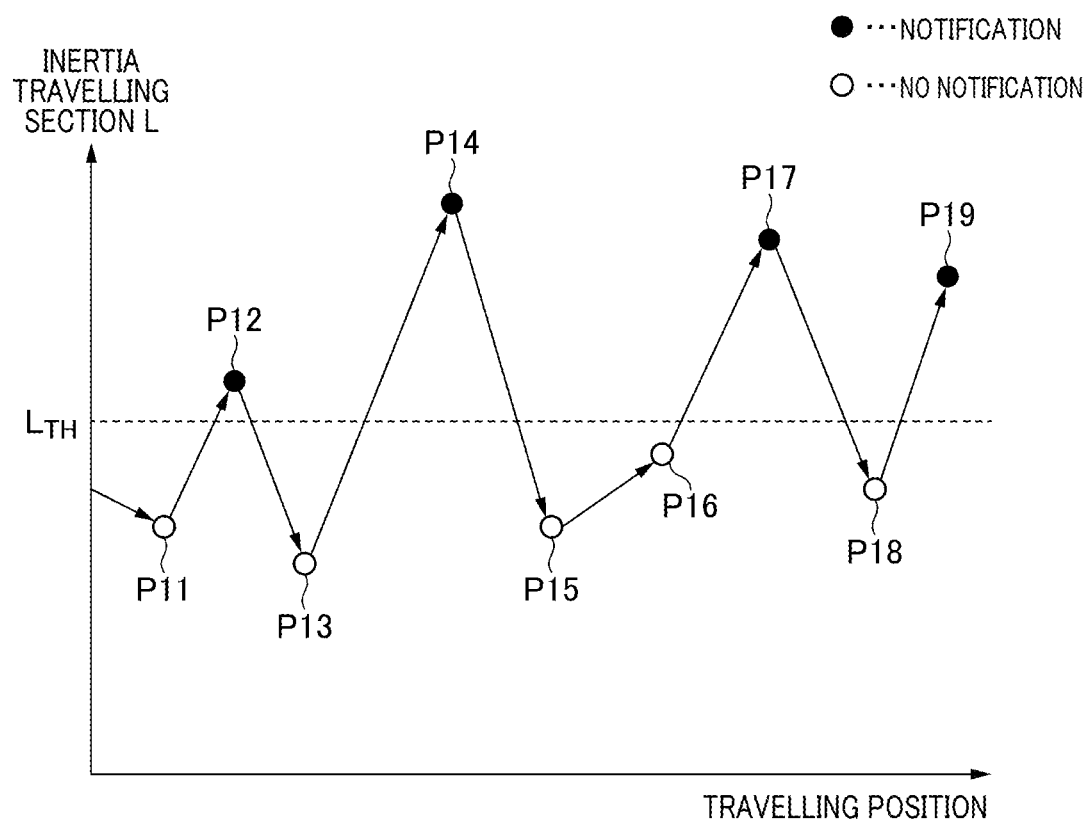
FIG. 9 is a graph for explaining a condition at which a notification is performed.

In FIG. 9, P11 to P17 each indicates a location at which the determination at step S05 is Yes after setting the inertia travelling section at step S04 while the vehicle MV is travelling for a predetermined distance D1. In FIG. 9, lengths of the inertia travelling section L set for respective locations are plotted. The threshold $L_{TH}$ shown in FIG. 9 is for the inertia travelling section L and corresponds to threshold $E_{TH}$ set at step S21 shown in FIG. 8.

For example, when the threshold $L_{TH}$ is set as shown in FIG. 9, notifications are actually issued at respective locations P12, P14, P17 and P19.

Assuming that the driver's burden becomes larger, the threshold $E_{TH}$ and the threshold $L_{TH}$ corresponding to the threshold $E_{TH}$ are set to be larger than values shown in FIG. 9. As a result, since a frequency in which the inertial travelling section L exceeds the threshold $L_{TH}$ is small, a frequency of notifications actually executed becomes smaller.

As described above, the changing unit 13 according to the present embodiment changes the frequency of notifications by the above-described notification unit based on both of the driver's burden and the reduction amount of an energy consumption during the inertia travelling. Specifically, the changing unit 13 changes the threshold $E_{TH}$ based on the driver's burden (step S21), only when the reduction amount of an energy consumption during the inertia travelling is larger than or equal to a predetermined threshold $E_{TH}$, while the notification unit issues a notification. Thus, more appropriate notification can be issued considering not only the driver's burden but also the energy consumption.

As described, the present embodiment is described with reference to specific examples. However, the present disclosure is not limited to these specific examples. For these specific examples, a person ordinary skill in the art appropriately may appropriately modify the design thereof. These modified designs are included in the scope of the present disclosure as long as features of the present disclosure is provided therein. Further, respective elements included in the above-described specific examples, an arrangement, conditions and shapes thereof are not limited to the above-exemplified elements and may be appropriately modified. The respective elements in the above-described specific examples may be appropriately combined as long as no technical inconsistency is present.

The control unit and method thereof disclosed in the present disclosure may be accomplished by one or more dedicated computers constituted of a processor and a memory programmed to execute one or more functions embodied by computer programs. Alternatively, the control unit and method thereof disclosed in the present disclosure may be accomplished by a dedicated computer provided by a processor configured of one or more dedicated hardware logic circuits. Further, the control unit and method thereof disclosed in the present disclosure may be accomplished by one or more dedicated computers where a processor and a memory programmed to execute one or more functions, and a processor including one or more hardware logic circuits are combined. Furthermore, the computer programs may be stored, as instruction codes executed by the computer, into a computer readable non-transitory tangible recording media. The dedicated hardware logic circuit and the hardware logic circuit can be accomplished by a digital circuit including a plurality of logic circuits or an analog circuit.

CONCLUSION

The present disclosure provides a driving operation supporting apparatus capable of appropriately issuing a notification.

A driving operation supporting apparatus of a vehicle is provided with a notification unit that notifies a driver of an operation command for prompting the driver to perform operations to cause the vehicle to start inertia travelling; and a changing unit that changes at least one of a frequency of notifications of the notification unit, a notification timing and a notification method, depending on at least one of a burden of the driver, a reduction amount of an energy consumption when performing the inertia travelling and a surrounding situation of the vehicle.

According to the driving operation supporting apparatus having the above configuration, at least one of a frequency of notifications issued by the notification unit, the notification timing and the method thereof are appropriately changed. Thus, notifications for prompting the driver to perform driving operation can be more appropriately issued compared to a conventional configuration.

What is claimed is:

1. A driving operation supporting apparatus of a vehicle comprising:
a notification unit that notifies a driver of an operation command for prompting the driver to perform operations to cause the vehicle to start inertia travelling; and
a processor and a memory storing instructions that are executed by the processor, the processor when executing the instructions being configured to:
change at least one of (1) a frequency of notifications provided by the notification unit, (2) a notification timing of the notifications and (3) a notification method of the notifications, depending on (i) a reduction amount of an energy consumption when performing the inertia travelling and (ii) a burden of the driver, wherein the processor
estimates the reduction amount of the energy consumption using a relationship data between the reduction amount of the energy consumption and a length of an inertia traveling section where the notification unit notifies the driver to start the inertia traveling, the relationship data having been prepared in advance based on characteristics of the vehicle,
changes the at least one of (1) the frequency of the notifications provided by the notification unit, (2) the notification timing of the notifications and (3) the notification method of the notifications by comparing the reduction amount of the energy consumption that has been estimated with a predetermined threshold, and
changes the predetermined threshold based on the burden of the driver.

2. The driving operation supporting apparatus according to claim 1, wherein
the processor changes the frequency of the notifications issued by the notification unit based on the burden of the driver; and
the frequency changed by the processor is a ratio of a number of notifications actually performed by the notification unit in a predetermined period to a number of determinations in which the operation command is determined as necessary in the predetermined period.

3. The driving operation supporting apparatus according to claim 1, wherein
the processor changes the frequency of the notifications issued by the notification unit based on the burden of the driver; and
the frequency changed by the processor is a number of notifications issued by the notification unit during a period where the vehicle is travelling for a predetermined distance.

4. The driving operation supporting apparatus according to claim 1, wherein
the processor causes the notification unit to issue the notification only when the reduction amount of the energy consumption when performing the inertia travelling is larger than or equal to the predetermined threshold.

5. The driving operation supporting apparatus according to claim 1, wherein
the processor acquires the burden of the driver based on at least one of a biological signal relating to the driver, a state of a travelling road where the vehicle travels, a number of passengers in the vehicle, a margin of an operation schedule of the vehicle and an ambient brightness around the vehicle.

6. The driving operation supporting apparatus according to claim 5, wherein
the processor acquires the burden of the driver based on the biological signal relating to the driver; and
the biological signal indicates at least one of a degree of fatigue and an awareness level of the driver.

7. The driving operation supporting apparatus according to claim 5, wherein
the processor acquires the burden of the driver based on a plurality of parameters among the biological signal relating to the driver, the state of the travelling road where the vehicle travels, the number of passengers in the vehicle, the margin of the operation schedule of the vehicle and the ambient brightness around the vehicle.

8. The driving operation supporting apparatus according to claim 7, wherein
the processor acquires respective burdens of the driver corresponding to the plurality of parameters, and acquires a largest one of the respective burdens to be a conclusive burden.

9. The driving operation supporting apparatus according to claim 7, wherein
the processor acquires respective burdens of the driver corresponding to the plurality of parameters, and acquires an average value or a weighted average value of the plurality of burdens to be a conclusive burden.

10. The driving operation supporting apparatus according to claim 5, wherein
the processor acquires the burden of the driver based on the state of the travelling road where the vehicle travels; and
the state of the travelling road where the vehicle travels is at least one of a congestion degree of the travelling road, a number of traffic lanes of the travelling road and a number of traffic signals provided in a predetermined area of the travelling road.

11. The driving operation supporting apparatus according to claim 1, wherein
the processor changes a notification timing of the notification unit based on a congestion degree of a travelling road where the vehicle travels, thereby changing a section of the inertia travelling.

12. The driving operation supporting apparatus according to claim 1, wherein
the notification unit notifies the driver of the operation command by using at least one of a sound, a screen display, a light and a vibration.

13. The driving operation supporting apparatus according to claim 12, wherein
the notification unit notifies the driver of the operation command by using the sound; and
the processor changes at least one of a loudness, a tone and a phrase of the sound.

14. The driving operation supporting apparatus according to claim 12, wherein
the notification unit uses the screen display to notify the driver of the operation command; and
the processor changes at least one of a brightness, a color of the screen display, a color of a background image, a size of the screen display, a type of icon and a display position of the icon.

15. The driving operation supporting apparatus according to claim 12, wherein the notification unit uses the light to notify the driver of the operation command; and the processor changes at least one of a brightness of the light, a color of the light and the emission timing of the light.

16. The driving operation supporting apparatus according to claim 12, wherein the notification unit uses the vibration to notify the driver of the operation command; and the processor changes at least one of an intensity of the vibration, a vibration position, a vibration pattern and a vibration frequency.

17. The driving operation supporting apparatus according to claim 12, wherein the notification unit utilizes two types of means among the sound, the screen display, the light and the vibration to notify the driver; and the processor changes the means utilized for the notification of the notification unit.

18. The driving operation supporting apparatus according to claim 17, wherein the processor changes the means utilized for the notification of the notification unit depending on a surrounding situation of the vehicle.

* * * * *